US011619141B2

United States Patent
Le Brun et al.

(10) Patent No.: US 11,619,141 B2
(45) Date of Patent: Apr. 4, 2023

(54) LUBRICATING OIL CIRCUIT OF A TURBOMACHINE, TURBOMACHINE AND REGULATION METHOD THEREOF

(71) Applicant: Safran Aircraft Engines, Paris (FR)

(72) Inventors: Christophe Marc Alexandre Le Brun, Moissy-Cramayel (FR); Sébastien Jean Fernand Deneuve, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 634 days.

(21) Appl. No.: 16/598,491

(22) Filed: Oct. 10, 2019

(65) Prior Publication Data

US 2020/0116049 A1 Apr. 16, 2020

(30) Foreign Application Priority Data

Oct. 11, 2018 (FR) ...................................... 1859410

(51) Int. Cl.
*F01D 25/18* (2006.01)
*F16H 57/04* (2010.01)
*F02C 7/14* (2006.01)

(52) U.S. Cl.
CPC ................ *F01D 25/18* (2013.01); *F02C 7/14* (2013.01); *F16H 57/04* (2013.01); *F16H 57/0413* (2013.01); *F16H 57/0415* (2013.01)

(58) Field of Classification Search
CPC ...... F01D 25/18; F16H 57/04; F16H 57/0413; F16H 57/0415; F02C 7/14; F01M 5/00;

(Continued)

(56) References Cited

U.S. PATENT DOCUMENTS 3,907,386 A 9/1975 Kasmarik et al.
2011/0232293 A1* 9/2011 Leese ...................... F02C 7/185
165/41

(Continued)

FOREIGN PATENT DOCUMENTS

FR 3 002 591 A1 8/2014
FR 3 060 057 A1 6/2018

OTHER PUBLICATIONS

Nise, N. Control Systems Engineering, 6th ed. Wiley, 2011. p. 494-495. (Year: 2011).*

(Continued)

*Primary Examiner* — Woody A Lee, Jr.
*Assistant Examiner* — Elton K Wong
(74) *Attorney, Agent, or Firm* — Sughrue Mion, PLLC

(57) ABSTRACT

A lubricating oil circuit of a turbomachine includes a distribution valve that distributes an oil flow rate among a first heat exchanger and a bypass duct, connected to an oil duct, which is connected to an heat exchanger positioned against a turbomachine fuel passage duct, and includes a gearbox of a rotation speed reducer that lowers a rotational speed of a first rotary fan shaft of the turbomachine relative to a rotational speed of a second low-pressure compressor rotary shaft of the turbomachine or of a second low-pressure turbine rotary shaft of the turbomachine, and a regulation device. The regulation device includes a local regulation loop that generates an oil flow rate distribution control signal and regulates an oil temperature of the oil duct on a temperature setpoint, and a global regulation loop that generates the temperature setpoint as a function of the temperature and of the temperature setpoint.

11 Claims, 5 Drawing Sheets

Figure 1:
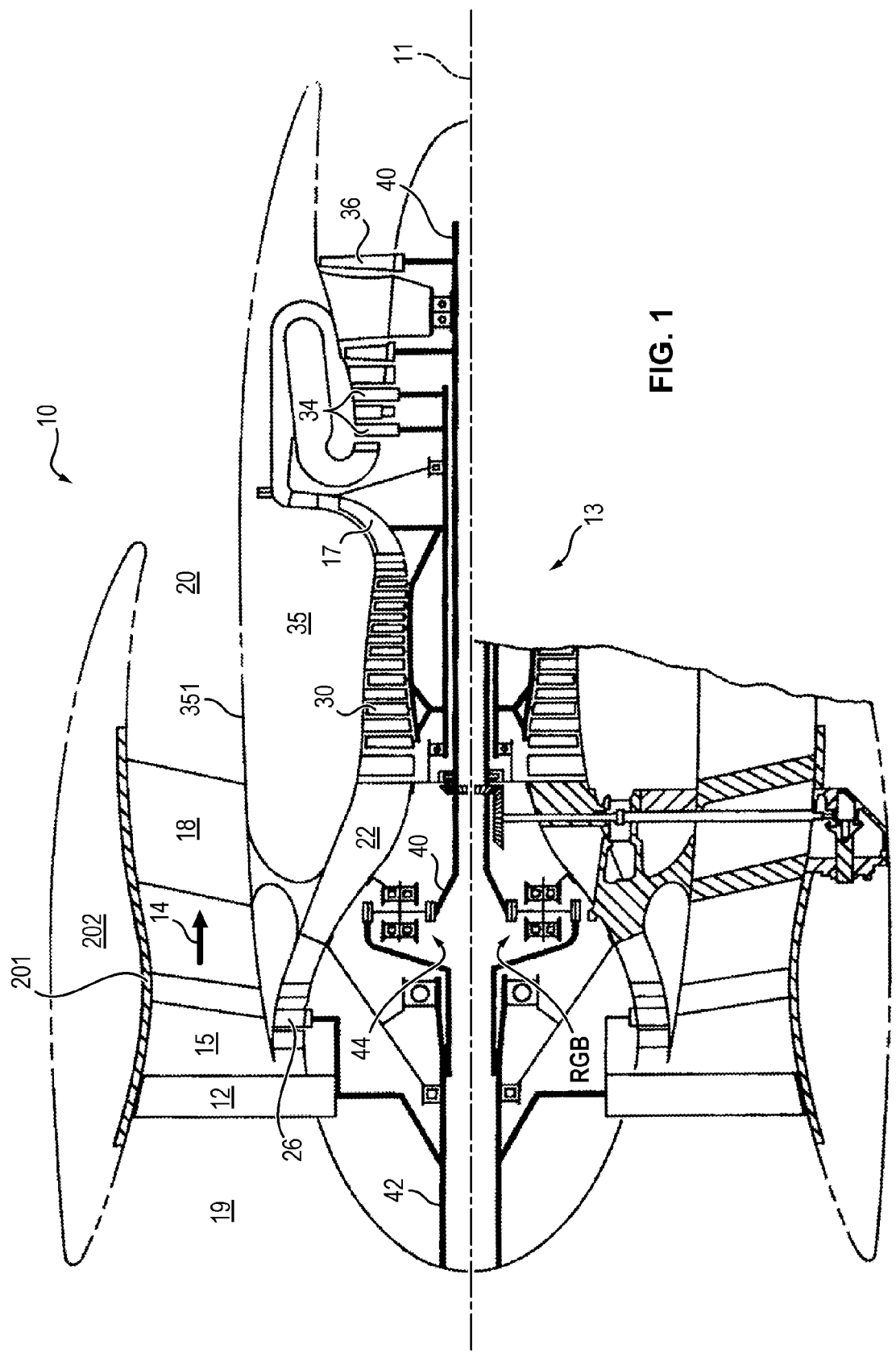

(58) Field of Classification Search
CPC .... F01M 5/005; F01M 1/12; F05D 2270/303; F05D 2260/213; F05D 2260/40311
USPC .............................................. 184/6.11, 6.22
See application file for complete search history.

(56) References Cited

U.S. PATENT DOCUMENTS

| | | |
|---|---|---|
| 2015/0044036 A1* | 2/2015 | Fitzpatrick ................ F02C 7/14 |
| | | 184/6.1 |
| 2016/0003148 A1 | 1/2016 | Gameiro et al. |
| 2016/0024968 A1 | 1/2016 | Stearns et al. |
| 2016/0341074 A1* | 11/2016 | Fang ........................ F01D 25/18 |

OTHER PUBLICATIONS

Seok, J. Automatic Mode Switching of P/PI Speed Control for Industry Servo Drives Using Online Spectrum Analysis of Torque Command [online], Oct. 2007, [retrieved on Feb. 24, 2022], Retrieved from IEEE <URL: https://ieeexplore.ieee.org/document/4285960> (Year: 2007).*

* cited by examiner

LUBRICATING OIL CIRCUIT OF A
TURBOMACHINE, TURBOMACHINE AND
REGULATION METHOD THEREOF

The invention relates to a lubricating oil circuit of a turbomachine, as well as to a turbomachine provided with this oil circuit and a method for regulating this circuit.

Such turbomachines can be for example aircraft turbojet engines.

The field of application of the invention relates to the turbomachines, which comprise a rotation reducer so that the rotational speed of a rotary fan shaft of the turbomachine is lowered relative to that of a first low-pressure compressor or low-pressure turbine rotary shaft of the turbomachine.

The reducer makes it possible to dissociate the rotational speed of the turbines with respect to the rotational speed of the fan, which allows reducing the fuel consumption.

However, the transmission of very large torques to the fan leads to high heating which can damage the reducer. An oil circuit used to lubricate the reducer is then provided to pass a sufficient oil flow rate in order to discharge the calories.

According to a goal of the invention, it is sought to control the oil flow rate and the temperature upstream of the reducer, while meeting certain performance (accuracy, response time and overflow) and robustness requirements.

The inventors have noticed an additional difficulty in regulating the temperature of the oil in the reducer, due to the fact that the flowing of oil in the pipes between the valve and the inlet of the reducer induces a pure delay, because of the relatively great length of these pipes, and to the fact that the action of the valve acts on the temperature of the oil of the reducer only after this delay.

The invention aims at obtaining a lubricating oil circuit of a turbomachine, as well as a turbomachine provided therewith and a regulation method, which allow achieving the goals indicated above.

To this end, a first subject matter of the invention is a a-lubricating oil circuit of a turbomachine, the circuit comprising a distribution valve configured to distribute, as a function of an oil flow rate distribution control signal, an oil flow rate among a first heat exchanger positioned in contact with a secondary gas flow of the turbomachine to cool the oil therein and a bypass duct, both connected to a first oil duct, which is connected to a second heat exchanger positioned against a turbomachine fuel passage duct to cool the oil therein, wherein the oil circuit comprises:

a gearbox of a rotation speed reducer configured to lower a rotational speed of a first rotary fan shaft of the turbomachine relative to a rotational speed of a second low-pressure compressor rotary shaft of the turbomachine or of a second low-pressure turbine rotary shaft of the turbomachine, a second oil duct between the second exchanger and the gearbox, and a regulation device for regulating a second oil temperature of the second oil duct on a second temperature setpoint present on an inlet of the device, the device comprising:

a local regulation loop, configured to generate the oil flow rate distribution control signal and regulate a first oil temperature of the first oil duct on a first temperature setpoint,
  a global regulation loop, configured to generate the first temperature setpoint as a function of the second temperature and of the second temperature setpoint.

The invention thus allows servo-controlling the temperature of the gearbox of the reducer, but also an intermediate temperature, namely the first temperature of the first oil duct located between the two exchangers to overcome the problems indicated above. Thus, this first temperature is chosen just downstream of the junction of the pipes between the first surface exchanger and the bypass duct, so as to measure the temperature of a homogeneous mixture, while minimizing the pure delay between the action of the valve and the first temperature of the oil in the first duct. When the thermal exchanges between the equipments and the gearbox change, the global loop will take it into account and adjust the second oil temperature by providing the appropriate setpoint of the first temperature. When the thermal heating of the engine change, the first oil temperature will be disturbed (before the disturbance is perceived on the second temperature) and the local loop will quickly reject this disturbance. The invention allows obtaining the targeted performances without modifying the thermo-hydraulic architecture of the system, which results from the installation constraints.

According to one embodiment of the invention, wherein the local regulation loop comprises a first sensor to measure the first oil temperature.

According to one embodiment of the invention, the local regulation loop comprises a first corrector configured to generate the oil flow rate distribution control signal of the distribution valve as a function of the first oil temperature and of the first temperature setpoint.

According to one embodiment of the invention, the local regulation loop comprises a first subtracter configured to calculate a first temperature difference between the first oil temperature and the first temperature setpoint, the first corrector being configured to generate the oil flow rate distribution control signal of the distribution valve as a function of the first temperature difference.

According to one embodiment of the invention, the regulation device comprises a third corrector configured to calculate, from the second temperature setpoint, an anticipative term, and the first subtracter is configured to calculate a sum of the first temperature difference and of the anticipative term of the second temperature setpoint.

According to one embodiment of the invention, the third corrector is configured to calculate the anticipative term of the second temperature setpoint, equal to a sum of the second temperature setpoint and of a corrective term which is a function of a rotational speed of the low-pressure compressor.

According to one embodiment of the invention, the global regulation loop comprises a second sensor to measure the second oil temperature.

According to one embodiment of the invention, the global regulation loop comprises a second corrector configured to generate the first temperature setpoint as a function of the second temperature and of the second temperature setpoint.

According to one embodiment of the invention, the global regulation loop comprises a second subtracter configured to calculate a second temperature difference between the second oil temperature and the second temperature setpoint, the second corrector being configured to generate the first temperature setpoint as a function of the second temperature difference.

According to one embodiment of the invention, the first corrector and/or the second corrector comprise(s) a sum of a proportional transfer function and of an integrating transfer function.

According to one embodiment of the invention, the first corrector comprises a sum of a proportional transfer function and of an integrating transfer function, the first corrector comprises a detector for detecting a maximum saturation of the oil flow rate distribution control signal, corresponding to the oil flow rate completely sent into the first heat exchanger, and a means for neutralizing, for a prescribed duration, the integrating transfer function of the first corrector when the detector has detected the maximum saturation of the oil flow rate distribution control signal.

A second subject matter of the invention is a turbomachine comprising a fan, a low-pressure compressor, a low-pressure turbine, a high-pressure compressor, a high-pressure turbine, a low-pressure compressor rotary shaft, a low-pressure turbine rotary shaft, a first rotary fan shaft, a rotation speed reducer configured to lower a rotational speed of the first rotary fan shaft relative to a rotational speed of a second low-pressure compressor rotary shaft or of a second low-pressure turbine rotary shaft, and a lubricating oil circuit of the turbomachine as described above.

A third subject matter of the invention is a method for regulating a lubricating oil circuit of a turbomachine, the lubricating oil circuit comprising a distribution valve configured to distribute, as a function of an oil flow rate distribution control signal, an oil flow rate among a first heat exchanger positioned in contact with a secondary gas flow of the turbomachine to cool the oil therein and a bypass duct, both connected to a first oil duct, which is connected to a second heat exchanger positioned against a turbomachine fuel passage duct to cool the oil therein, wherein the lubricating oil circuit comprises:

a gearbox of a rotation speed reducer configured to lower a rotational speed of a first rotary fan shaft of the turbomachine relative to a rotational speed of a second low-pressure compressor rotary shaft of the turbomachine or of a second low-pressure turbine rotary shaft of the turbomachine, a second oil duct between the second exchanger and the gearbox, and a regulation device for regulating a second oil temperature of the second oil duct on a second temperature setpoint present on an inlet of the device, the method comprising:

generating at a local regulation loop of the regulation device the oil flow rate distribution control signal to regulate a first oil temperature of the first oil duct on a first temperature setpoint, generating at a global regulation loop the first temperature setpoint as a function of the second oil temperature and of the second temperature setpoint.

Figure 2:
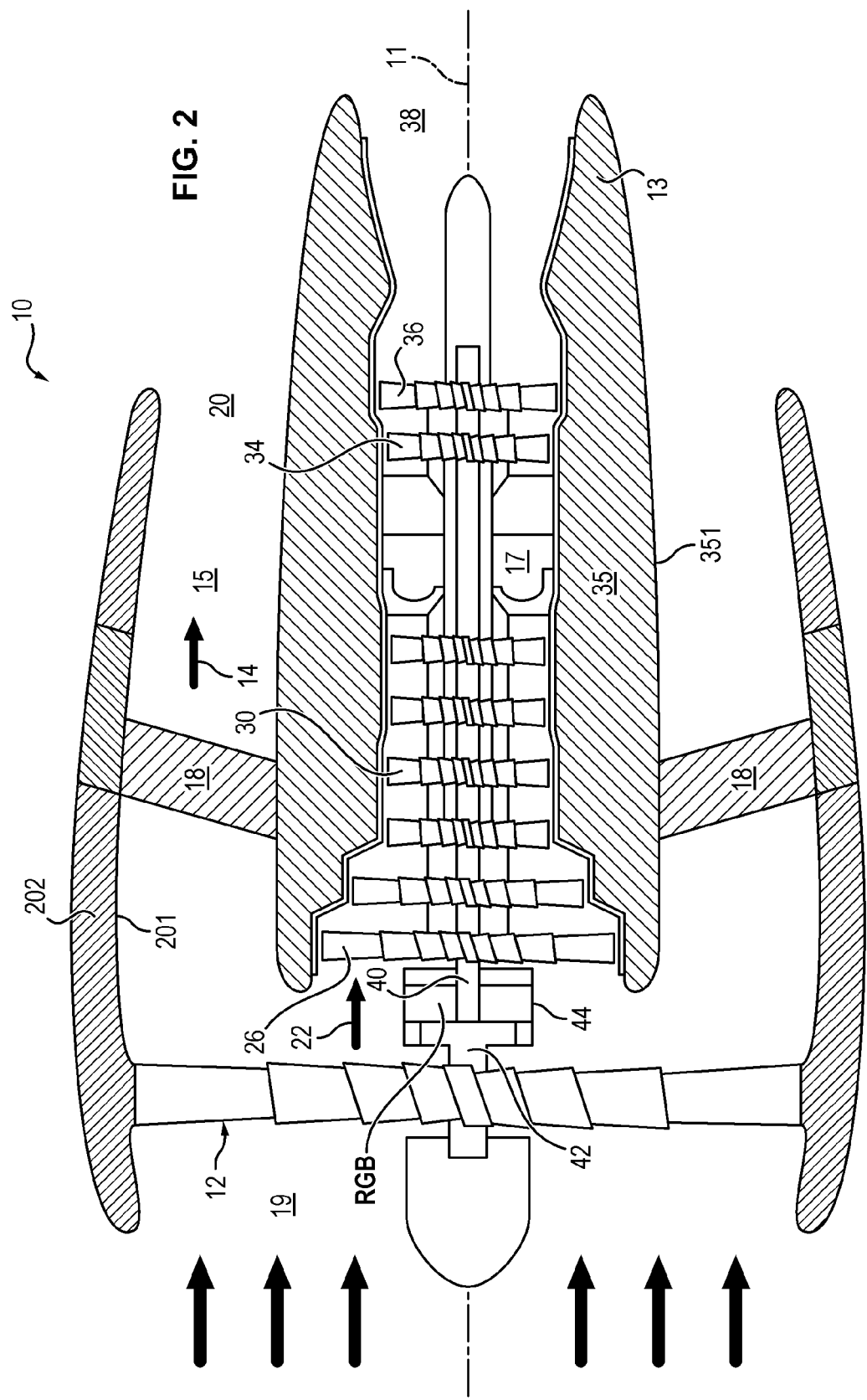
Figure 3:
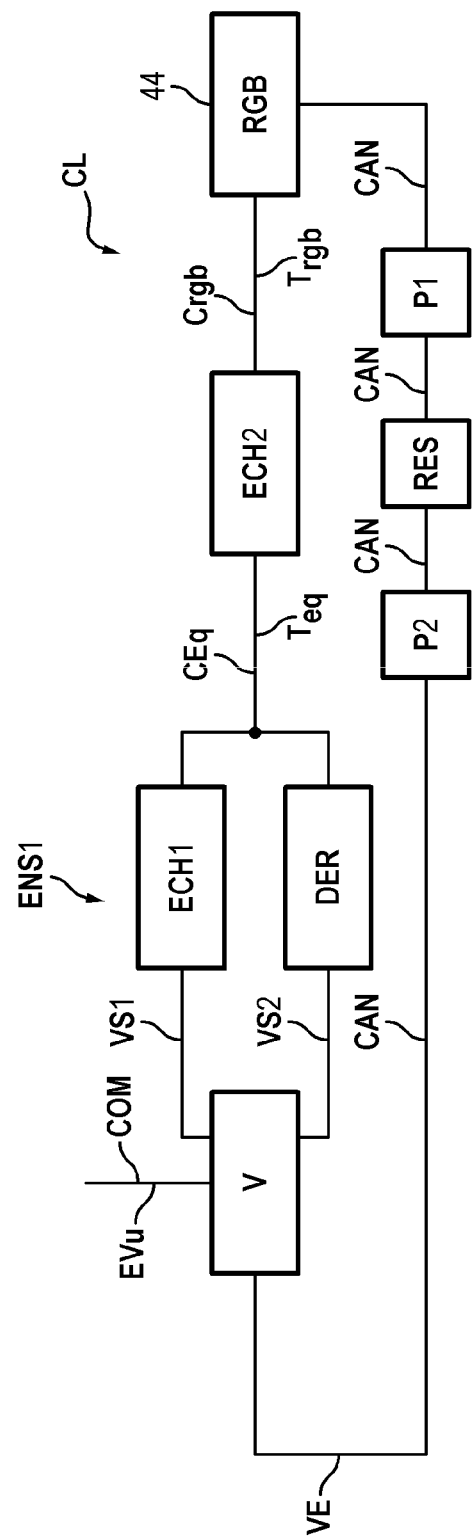
Figure 4:
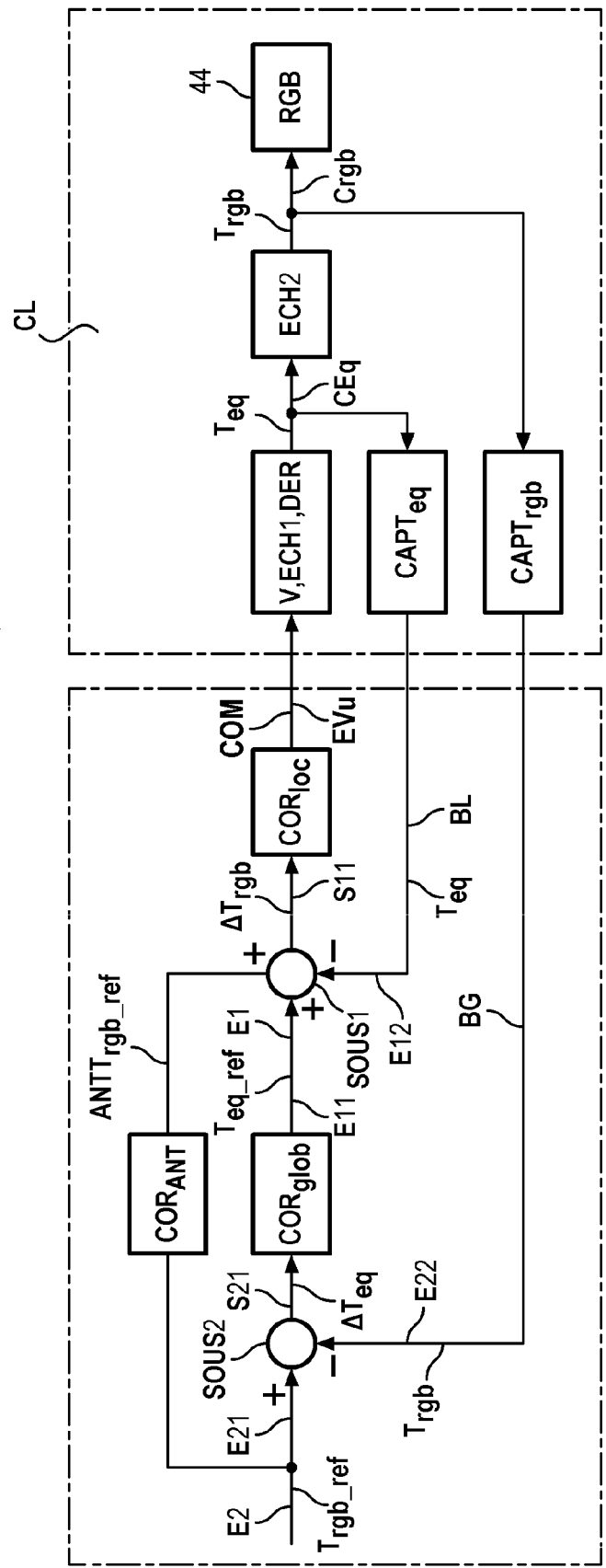
Figure 5:
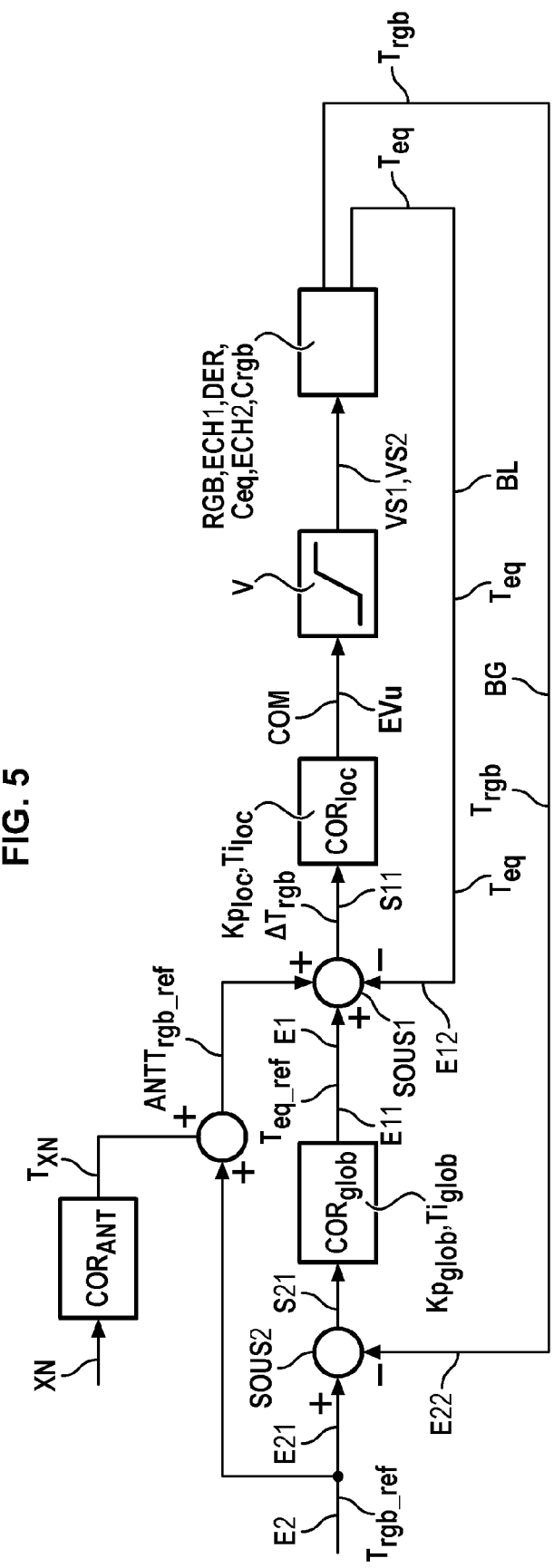

The invention will be better understood upon reading the following description, given only by way of non-limiting example with reference to the appended drawings, in which:

FIGS. 1 and 2 schematically represent in longitudinal section a first example and a second example of a turbomachine to which can be applied the oil circuit, the regulation device and method according to the invention, FIG. 3 is a modular diagram schematically representing the oil circuit according to one embodiment of the invention, FIG. 4 is a modular diagram schematically representing the oil circuit and the regulation device according to one embodiment of the invention, FIG. 5 is a modular diagram schematically representing the regulation device according to one embodiment of the invention.

Two examples of a turbomachine are represented in FIGS. 1 and 2. In these examples, the turbomachine 10 is a turbojet engine intended to be installed on an aircraft (not represented) to propel it in the air, such as, for example, an aircraft. The gas turbine engine or turbomachine 10 assembly has a longitudinal axis 11. The direction from the inside toward the outside is the radial direction starting from the longitudinal axis 11. The turbomachine 10 is in this example a dual-body and dual-flow turbomachine. The turbomachine 10 comprises a fan assembly 12 and a central gas turbine engine 13. The central gas turbine engine 13 comprises, from upstream to downstream in the direction of flowing of the gases, a low-pressure compressor 26, a high-pressure compressor 30, a combustion chamber 16, a high-pressure turbine 34 and a low-pressure turbine 36, which define a primary gas flow 22 in the central gas turbine engine 13. The fan assembly 12 comprises a fan blading extending radially outwards from a rotary fan shaft 42. The turbomachine 10 has an intake side 10 and an exhaust side 20. The turbomachine 10 comprises an inter-flowpath compartment delimited by an external casing 351, or engine casing, to provide an axial support to the fan assembly 12, to the low-pressure compressor 26, to the high-pressure compressor 30, to the high-pressure turbine 34 and to the low-pressure turbine 36. The high-pressure turbine 34 is secured to the high-pressure compressor 30 so as to form a high-pressure body, so that the high-pressure turbine 34 rotatably drives the high-pressure compressor 30 about the axis 11 under the effect of the thrust of the gases coming from the combustion chamber 17.

In the embodiment of FIG. 1, a rotation speed reducer 44 is mounted between the rotary shaft 40 of the low-pressure turbine 36 and the rotary shaft 42 of the fan and is configured to lower the rotational speed of the rotary shaft 42 of the fan relative to the rotational speed of the rotary shaft 40 of the low-pressure turbine 36. In addition, in the case of FIG. 1, the rotary fan shaft 42 is secured to the low-pressure compressor 26. Thus, the low-pressure turbine 36 rotatably drives, through the reducer 44, the low-pressure compressor 26 and the fan assembly 12 about the axis 11 under the effect of the thrust of the gases coming from the combustion chamber 17.

In the embodiment of FIG. 2, a rotation speed reducer 44 is mounted between the rotary shaft 40 of the low-pressure compressor 26 and the rotary shaft 42 of the fan and is configured to lower the rotational speed of the rotary shaft 42 of the fan relative to the rotational speed of the rotary shaft 40 of the low-pressure compressor 26. In addition, in the case of FIG. 2, the rotary shaft 40 of the low-pressure compressor 26 is secured to the low-pressure turbine 36, so that the low-pressure turbine 36 rotatably drives the low-pressure compressor 26 about the axis 11 under the effect of the thrust of the gases coming from the combustion chamber 17. The rotary shaft 40 of the low-pressure compressor 26 rotatably drives, through the reducer 44, the fan assembly 12 about the axis 11.

In operation, on FIGS. 1 and 2, the air flows through the fan assembly 12 and a first portion 22 (primary flow 22) of the air flow is conveyed through the low-pressure compressor 26 and the high-pressure compressor 30, in which the air flow is compressed and sent to the combustion chamber 17. The hot combustion products (not represented in the figures) coming from the combustion chamber 17 are used to drive the turbines 34 and 36 and produce the thrust of the turbomachine 10. The turbomachine 10 also comprises a bypass passageway 15 which is used to pass a second portion 14 (secondary flow 14) of the air flow discharged from the fan assembly 12 around the central gas turbine engine 13. More specifically, the bypass passageway 15 extends between an inner wall 201 of a fan fairing 202 or nacelle 202 and an outer wall 351 of the casing 35 surrounding the central gas turbine engine 13. Struts 18 connect the casing 35 to the inner wall 201 of the fairing 202 through the bypass passageway 15 of the secondary flow 14.

With reference to FIGS. 3 to 5, a lubricating oil circuit CL according to the invention is described below, serving to lubricate a turbomachine and to carry out thermal exchanges, and able to be used in the turbomachine 10 of FIG. 1 and/or in the turbomachine 10 of FIG. 2.

The lubricating oil circuit CL of a turbomachine comprises successively from the inlet of the circuit CL an oil flow rate distribution valve V, a first assembly ENS1 of a first oil-air heat exchanger ECH1 and of a bypass duct DER, a first oil duct CEq, a second oil-fuel heat exchanger ECH2, a second oil duct Crgb and a gearbox RGB (from the acronym Reduction Gear Box) of the rotation speed reducer 44. This gearbox RGB comprises several toothed wheels gearing with each other, at least one toothed wheel of which is fixed on the first rotary fan shaft 42 and at least another toothed wheel of which is fixed on the second low-pressure compressor 26 or low-pressure turbine 36 rotary shaft 40. The reducer 44 may be for example of the epicycloidal type. In addition, to ensure the return of the oil coming from the gearbox RGB toward the valve V, the circuit CL comprises on one or more return pipes CAN successively a first oil recovery pump P1, an oil reservoir RES and the second oil supply pump P2. The pump P1 is used to recover the lubricating oil from the toothed wheels of the gearbox RGB, which falls back into the bottom of this gearbox RGB, and to return it toward the valve V. Oil can pass through the above elements of the circuit CL. The lubricating oil circuit CL is in particular used to lubricate and absorb the calories of the gears present in the gearbox RGB of the rotation speed reducer 44.

The first heat exchanger ECH1 is an air-cooled heat exchanger and is positioned in the bypass passageway 15 of the secondary air flow 22 and is in contact with the secondary flow 22 to cool the oil passing through this first exchanger ECH1. The exchanger ECH1 may be of the surface type, for example annular about the axis 11 or the like, or of the volumic type and for example parallelepipedic. The exchanger ECH1 may be coupled to the inner wall 201 of the fan fairing 202, or to the outer wall 351 of the casing 35.

The distribution valve V is configured to distribute, as a function of an oil flow rate distribution control signal COM, present on a control inlet EVu, the oil flow rate towards the first heat exchanger ECH1 and the bypass duct DER. The valve V may be or comprise a three-way type valve, comprising a first outlet channel VS1 connected to the upstream side of the first exchanger ECH1, a second outlet channel VS2 connected to the upstream side of the bypass duct DER and a third inlet channel VE receiving the oil flow rate and connected to the pipe CAN, that is to say to the pump P2. The downstream side of the first heat exchanger ECH1 and the downstream side of the bypass duct DER are connected to the first oil conduit CEq. Thus, a variable portion of the oil flow rate present on the third inlet channel VE is sent to the first channel VS1 toward the first exchanger ECH1 as a function of the oil flow rate distribution control signal COM and a complementary variable portion of the oil flow rate present on the third inlet channel VE is sent to the second channel VS2 toward the bypass duct DER as a function of the oil flow rate distribution control signal COM. The oil flow rate distribution control signal COM may be a voltage signal or others.

The second heat exchanger ECH2 is positioned against a turbomachine fuel passage duct, not shown, so that the fuel cools the oil passing through this second exchanger ECH2. Thermal exchanges also take place by convection with the external environment. The second heat exchanger ECH2 may be parallelepiped-shaped, for example brick-shaped.

The lubricating oil circuit CL comprises a device REG for regulating the temperature of the oil. The regulation device REG can be embedded on the turbomachine 10 with the lubricating oil circuit CL. The regulation device REG is configured to regulate the second temperature $T_{rgb}$ of the oil present in the second duct Crgb on a second temperature setpoint $T_{rgb\_ref}$ present on a second inlet E2 of the device REG.

The regulation device REG comprises a local regulation loop BL and a global regulation loop BG.

The local regulation loop BL is configured to generate the oil flow rate distribution control signal COM and regulate the first oil temperature $T_{eq}$ of the first duct CEq on a first temperature setpoint $T_{eq\_ref}$ present on a first inlet E1.

The global regulation loop BG is connected to the first inlet E1 and is configured to generate the first setpoint $T_{eq\_ref}$ as a function of the second oil temperature $T_{rgb}$ of the second duct Crgb and of the second temperature setpoint $T_{rgb\_ref}$, present on the second inlet E2.

According to a method for regulating the oil circuit CL, the oil flow rate distribution control signal COM is generated by the local regulation loop BL of the regulation device REG to regulate the first oil temperature $T_{eq}$ of the first duct CEq on the first temperature setpoint $T_{eq\_ref}$. The first setpoint $T_{eq\_ref}$ is generated by the global regulation loop BG as a function of the second temperature $T_{rgb}$ and of the second temperature setpoint $T_{rgb\_ref}$.

The invention allows taking into account the pure delay with which the temperature $T_{rgb}$ is responsive to the commands COM of the valve V because of the length of the pipes of the oil circuit CL between the valve V and the gearbox RGB of the rotation speed reducer 44. This pure delay is also variable, since it depends on the oil flow rate.

The direct regulation of the temperature $T_{rgb}$ by a single regulation loop would have been difficult to achieve because of the length of the pipes between the valve V and the inlet conduit Crgb of the gearbox RGB, with the pure delay degrading in this case the performances. It is not possible to regulate only $T_{eq}$, because of the thermal exchanges between $T_{eq}$ and $T_{rgb}$, these thermal exchanges being variable and not perfectly modeled (they depend in particular on the temperature of the environment and on that of the fuel).

The global loop BG allows $T_{rgb}$ to follow the second temperature setpoint $T_{rgb\_ref}$ and to adapt to the thermal exchange variations between $T_{eq}$ and $T_{rgb}$. This loop BG is relatively slow to be robust vis-à-vis the pure delay, the uncertainties of models, which is not a problem given the slow dynamics of the thermal exchange variations. This global loop BG allows ensuring the performances in terms of accuracy, by determining the first adequate setpoint $T_{eq\_ref}$.

The local loop BL allows $T_{eq}$ to follow $T_{eq\_ref}$ and to adapt to the thermal heating of the engine. This loop BL is on the other hand faster than the loop BG, in order to bring $T_{eq}$ to $T_{eq\_ref}$ and consequently to change quickly, but with the delay, the temperature $T_{rgb}$ to a level close to $T_{rgb\_ref}$. This local loop BL allows ensuring the performances in terms of rapidity. The local loop BL allows adjusting with the same dynamics, with the pure delay, the temperature $T_{rgb}$. The global loop BG then allows adjusting slowly but accurately $T_{rgb}$ by providing the adequate setpoint $T_{eq\_ref}$.

According to one embodiment, the first oil temperature $T_{eq}$ is provided by a first measurement sensor $CAPT_{eq}$ positioned on the first oil duct CEq going from the assembly ENS1 to the second oil-fuel heat exchanger ECH2.

According to one embodiment, a first corrector $COR_{loc}$ of the local regulation loop BL, called local corrector, is configured to generate on the control inlet EVu the oil flow rate distribution control signal COM of the valve V as a function of the first oil temperature $T_{eq}$ and of the first temperature setpoint $T_{eq\_ref}$, for example as a function of the first temperature difference $\Delta T_{eq}$ between the first oil temperature $T_{eg}$ and the first temperature setpoint $T_{eq\_ref}$. This first difference $\Delta T_{eq} = T_{eq\_ref} - T_{eq}$ of temperature is provided for example by the outlet S11 of a first subtracter SOUS1, receiving on a first adder inlet E11 the first setpoint $T_{eq\_ref}$ and receiving on a second subtraction inlet E12 the first temperature $T_{eq}$ provided by the first measurement sensor $CAPT_{eq}$. The first adder inlet E11 is connected to the first inlet E1.

The dynamics of the thermal heating at the outlet of the gearbox RGB of the rotation reducer 44 depends on the change of the engine speed and proves to be much faster than the thermal exchanges between $T_{eq}$ and $T_{rgb}$. Indeed, the thermal exchanges in the second exchanger ECH2 are made with the fuel whose temperature variations are slow, the variation of these exchanges is thus relatively slow. In addition, the dynamics of the thermal exchanges with the outside is relatively slow.

According to one embodiment, the first corrector $COR_{loc}$ may be of the proportional and integral action type, that is to say be the sum of a proportional transfer function $Kp_{loc}$ and of an integrating transfer function (defined by a integration time constant $Ti_{loc}$). Of course, the first corrector $COR_{loc}$ may be of another type.

According to one embodiment, the first corrector $COR_{loc}$ comprises a detector for detecting a maximum saturation of the oil flow rate distribution control signal COM, corresponding to the oil flow rate entirely sent by the valve V into the first heat exchanger ECH1. This situation can happen under extreme hot conditions. In this case, no oil flow rate passes through the bypass duct DER. The first corrector $COR_{loc}$ comprises a means for neutralizing, for a prescribed period, the integrating transfer function of the first corrector $COR_{loc}$ when the detector has detected the maximum saturation of the oil flow rate distribution control signal COM. Such a corrector $COR_{loc}$ is called incremental corrector.

Under extreme cold conditions, the valve V is controlled by the oil flow rate distribution control signal COM so that the oil flow rate is entirely sent by the valve V into the bypass duct DER and no oil flow rate is sent into the first exchanger ECH1, because otherwise the viscosity of the oil passing through the first exchanger ECH1 would increase sharply due to the cooling of said oil at low temperature at the risk of creating unacceptable pressure drops or even freezing.

According to one embodiment, the second oil temperature $T_{rgb}$ is provided by a second measurement sensor $CAPT_{rgb}$ positioned on the second oil duct Crgb going from the second exchanger ECH2 to the gearbox RGB of the rotation reducer 44.

According to one embodiment, a second corrector $COR_{glob}$ of the local regulation loop BL, called global corrector, is configured to generate on the first inlet E1 the first setpoint $T_{eq\_ref}$ as a function of the second temperature $T_{rgb}$ and of the second setpoint $T_{rgb\_ref}$, by example as a function of the second temperature difference $\Delta T_{rgb}$ between the second temperature $T_{rgb}$ and the second setpoint $T_{rgb\_ref}$. This second difference $\Delta T_{rgb} = T_{rgb\_ref} - T_{rgb}$ of temperature is provided for example by the outlet S21 of a second subtracter SOUS2, receiving on a second adder inlet E21 the second setpoint $T_{rgb\_ref}$ and receiving on a second subtraction inlet E22 the second temperature $T_{rgb}$ measured by the second measurement sensor $CAPT_{rgb}$. The second adder inlet E21 is connected to the second inlet E2.

According to one embodiment, the second corrector $COR_{glob}$ may be of the proportional and integral action type, that is to say be the sum of a proportional transfer function $Kp_{glob}$ and of an integrating transfer function (defined by an integration time constant $Ti_{glob}$). Of course, the second corrector $COR_{glob}$ can be of another type.

According to one embodiment, a third corrector $COR_{ANT}$ of the regulation device is configured to calculate from the second setpoint $T_{rgb\_ref}$ an anticipative term $ANTT_{rgb\_ref}$ to anticipate this second setpoint $T_{rgb\_ref}$. For example, the first subtracter SOUS1 is configured to calculate a sum $T_{eq\_ref} - T_{eq} + ANTT_{rgb\_ref}$ on its outlet S11.

The anticipative term $ANTT_{rgb\_ref}$ makes it possible to provide more quickly the local loop BL with the variations of $T_{rgb\_ref}$ and to directly transmit the changes of the second temperature setpoint $T_{rgb\_ref}$ to the first setpoint $T_{eq\_ref}$ and to the local loop BL.

According to one embodiment, the third corrector $COR_{ANT}$ is configured to calculate the anticipative term $ANTT_{rgb\_ref}$ as being equal to a sum of the second setpoint $T_{rgb\_ref}$ and of a corrective term $T_{XN}$ modeling the thermal exchanges between $T_{eq\_ref}$ and $T_{rgb}$. The corrective term $T_{XN}$ is a function of a rotational speed XN of the low-pressure compressor CBP. For example, the corrective term $T_{XN}$ is generated by a pre-recorded one-dimensional table $T_{XN}$, giving $T_{XN}$ as a function of XN. This table $T_{ANT}$ allows taking into account an estimation of these thermal exchanges. The table $T_{ANT}$ of the action in anticipation may result from a model but could be adjusted after tests. Of course, the corrective term $T_{XN}$ may depend on a larger number of parameters.

The PID-IMC (Internal Model Control) method can be used to make the settings of the two correctors $COR_{loc}$ and $COR_{glob}$. This method allows analytically determining the settings by considering the transfer function of the system and the specifications, expressed in the form of a first-order transfer function.

According to one embodiment, the corrector $COR_{loc}$ of the local loop BL must be set first, since the corrector $COR_{glob}$ of the global loop BG depends thereon. The corrector $COR_{loc}$ of the local loop BL can be set from the model of the equipment. According to one embodiment, a low response time is conferred to the local loop BL in order to achieve the requested performances. This is feasible in the absence of pure delay in this loop BL.

According to one embodiment, in order to set the corrector $COR_{glob}$ of the global loop BG, a model including the local loop BL and the estimated maximum delay (which corresponds to the phases where a low flow rate is requested) can be considered. The action in anticipation was not considered for the setting. It is then possible to synthesize a PI corrector with a relatively large response time, so as to have a corrector $COR_{glob}$ robust to the model uncertainties, particularly to the variations of pure delay (which depends on the flow rate involved) and of gain (which depends on the engine temperature). The table of the action in anticipation results from a model but could also be adjusted after tests.

According to a method for regulating the oil circuit CL, the oil flow rate distribution control signal COM is generated by the local regulation loop BL of the regulation device REG to regulate the first oil temperature $T_{eq}$ of the first duct CEq on the first temperature setpoint $T_{eq\_ref}$. The first setpoint $T_{eq\_ref}$ is generated by the global regulation loop BG as a function of the second temperature $T_{rgb}$ and of the second temperature setpoint $T_{rgb\_ref}$.

The regulation device REG and the regulation method are implemented by automatic means, such as a calculator, a computer or a microprocessor, programmed by computer programs (including for example their inputs and outputs).

Of course, the embodiments, features, possibilities and examples above can be combined with each other or be selected independently of each other.

The invention claimed is:

1. A lubricating oil circuit of a turbomachine, the circuit comprising a distribution valve configured to distribute, as a function of an oil flow rate distribution control signal, an oil flow rate among a first heat exchanger positioned in contact with a secondary gas flow of the turbomachine to cool the oil therein and a bypass duct, both connected to a first oil duct, which is connected to a second heat exchanger positioned against a turbomachine fuel passage duct to cool the oil therein, wherein the oil circuit comprises:
a gearbox of a rotation speed reducer configured to lower a rotational speed of a rotary fan shaft of the turbomachine relative to a rotational speed of a low-pressure compressor rotary shaft of a low-pressure compressor of the turbomachine or of a low-pressure turbine rotary shaft of the turbomachine,
a second oil duct between the second heat exchanger and the gearbox, and
a regulation device for regulating a second oil temperature of the second oil duct on a second temperature setpoint present on an inlet of the regulation device, the regulation device comprising:
a local regulation loop, configured to generate the oil flow rate distribution control signal and regulate a first oil temperature of the first oil duct on a first temperature setpoint,
a global regulation loop, configured to generate the first temperature setpoint as a function of the second temperature and of the second temperature setpoint,
wherein the regulation device comprises a third corrector configured to calculate, from the second temperature setpoint, an anticipative term,
wherein the local regulation loop comprises a first subtracter configured to calculate a sum of the anticipative term and of a temperature difference between the first oil temperature and the first temperature setpoint,
wherein the local regulation loop comprises a first corrector configured to generate the oil flow rate distribution control signal of the distribution valve as a function of the sum.

2. The lubricating oil circuit according to claim 1, wherein the local regulation loop comprises a first sensor to measure the first oil temperature.

3. The lubricating oil circuit according to claim 1, wherein the third corrector is configured to calculate the anticipative term of the second temperature setpoint, equal to a sum of the second temperature setpoint and of a corrective term which is a function of a rotational speed of the low-pressure compressor.

4. The lubricating oil circuit according to claim 1, wherein the global regulation loop comprises a second sensor to measure the second oil temperature.

5. The lubricating oil circuit according to claim 1, wherein the global regulation loop comprises a second corrector configured to generate the first temperature setpoint as a function of the second temperature and of the second temperature setpoint.

6. The lubricating oil circuit according to claim 5, wherein the global regulation loop comprises a second subtracter configured to calculate a second temperature difference between the second oil temperature and the second temperature setpoint,
the second corrector being configured to generate the first temperature setpoint as a function of the second temperature difference.

7. The lubricating oil circuit according to claim 5, wherein the second corrector comprises a sum of a proportional transfer function and of an integrating transfer function.

8. The lubricating oil circuit according claim 1, wherein the first corrector comprises a sum of a proportional transfer function and of an integrating transfer function.

9. The lubricating oil circuit according to claim 1, wherein the first corrector comprises a sum of a proportional transfer function and of an integrating transfer function,
the first corrector comprises a detector for detecting a maximum saturation of the oil flow rate distribution control signal, corresponding to the oil flow rate completely sent into the first heat exchanger, and a neutralizer for neutralizing, for a prescribed duration, the integrating transfer function of the first corrector when the detector has detected the maximum saturation of the oil flow rate distribution control signal.

10. A turbomachine comprising a fan, a low-pressure compressor, a low-pressure turbine, a high-pressure compressor, a high-pressure turbine,
a low-pressure compressor rotary shaft, a low-pressure turbine rotary shaft, a first rotary fan shaft,
a rotation speed reducer configured to lower a rotational speed of the first rotary fan shaft relative to a rotational speed of the low-pressure compressor rotary shaft or of the low-pressure turbine rotary shaft,
and a lubricating oil circuit comprising a distribution valve configured to distribute, as a function of an oil flow rate distribution control signal, an oil flow rate among a first heat exchanger positioned in contact with a secondary gas flow of the turbomachine to cool the oil therein and a bypass duct, both connected to a first oil duct, which is connected to a second heat exchanger positioned against a turbomachine fuel passage duct to cool the oil therein,
wherein the oil circuit comprises:
a gearbox of the rotation speed reducer,
a second oil duct between the second heat exchanger and the gearbox,
a regulation device for regulating a second oil temperature of the second oil duct on a second temperature setpoint present on an inlet of the regulation device, the regulation device comprising:
a local regulation loop, configured to generate the oil flow rate distribution control signal and regulate a first oil temperature of the first oil duct on a first temperature setpoint,
a global regulation loop, configured to generate the first temperature setpoint as a function of the second temperature and of the second temperature setpoint,
wherein the regulation device comprises a third corrector configured to calculate, from the second temperature setpoint, an anticipative term,
wherein the local regulation loop comprises a first subtracter configured to calculate a sum of the anticipative term and of a temperature difference between the first oil temperature and the first temperature setpoint, wherein the local regulation loop comprises a first corrector configured to generate the oil flow rate distribution control signal of the distribution valve as a function of the sum.

11. A method for regulating a lubricating oil circuit of a turbomachine, the lubricating oil circuit comprising a distribution valve configured to distribute, as a function of an oil flow rate distribution control signal, an oil flow rate among a first heat exchanger positioned in contact with a secondary gas flow of the turbomachine to cool the oil therein and a bypass duct, both connected to a first oil duct, which is connected to a second heat exchanger positioned against a turbomachine fuel passage duct to cool the oil therein, wherein the lubricating oil circuit comprises:

a gearbox of a rotation speed reducer configured to lower a rotational speed of a rotary fan shaft of the turbomachine relative to a rotational speed of a low-pressure compressor rotary shaft of the turbomachine or of a low-pressure turbine rotary shaft of the turbomachine, a second oil duct between the second heat exchanger and the gearbox, and a regulation device for regulating a second oil temperature of the second oil duct on a second temperature setpoint present on an inlet of the regulation device, the method comprising:

generating at a local regulation loop of the regulation device the oil flow rate distribution control signal to regulate a first oil temperature of the first oil duct on a first temperature setpoint, generating at a global regulation loop the first temperature setpoint as a function of the second oil temperature and of the second temperature setpoint, calculating at a third corrector of the regulation device, from the second temperature setpoint, an anticipative term, calculating at a first subtracter of the local regulation loop a sum of the anticipative term and of a temperature difference between the first oil temperature and the first temperature setpoint, generating at a first corrector of the local regulation loop the oil flow rate distribution control signal of the distribution valve as a function of the sum.

* * * * *